(12) United States Patent
Coward

(10) Patent No.: US 6,633,899 B1
(45) Date of Patent: Oct. 14, 2003

(54) DYNAMIC INSTALLATION AND CONFIGURATION BROKER

(75) Inventor: Daniel R. Coward, San Francisco, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/397,162

(22) Filed: Sep. 16, 1999

Related U.S. Application Data

(60) Provisional application No. 60/139,220, filed on Jun. 14, 1999, and provisional application No. 60/133,054, filed on May 6, 1999.

(51) Int. Cl.$^7$ .............................................. G06F 13/00
(52) U.S. Cl. ................. 709/202; 709/217; 709/311; 709/313
(58) Field of Search ................................ 709/102, 201, 709/202, 203, 217, 223, 224, 225, 311, 313, 319, 318

(56) References Cited

U.S. PATENT DOCUMENTS

| | | | | |
|---|---|---|---|---|
| 5,329,619 A | * | 7/1994 | Page et al. .................. | 709/203 |
| 5,845,090 A | | 12/1998 | Collins, III et al. .... | 395/200.51 |
| 5,920,725 A | * | 7/1999 | Ma et al. .................... | 395/712 |
| 5,933,816 A | * | 8/1999 | Zeanah et al. ............... | 705/35 |
| 5,960,167 A | * | 9/1999 | Roberts et al. ................ | 710/8 |
| 6,182,154 B1 | * | 1/2001 | Campagnoni et al. ...... | 709/315 |
| 6,185,613 B1 | * | 2/2001 | Lawson et al. ............. | 709/224 |
| 6,199,204 B1 | * | 3/2001 | Donohue ..................... | 717/11 |
| 6,247,052 B1 | * | 6/2001 | Huang et al. ................ | 709/224 |
| 6,256,676 B1 | * | 7/2001 | Taylor et al. ................ | 709/246 |
| 6,324,691 B1 | * | 11/2001 | Gazdik .......................... | 717/11 |
| 6,362,836 B1 | * | 3/2002 | Shaw et al. .................. | 345/744 |
| 6,417,870 B1 | * | 7/2002 | Brackett et al. ............. | 345/771 |

FOREIGN PATENT DOCUMENTS

| | | | | |
|---|---|---|---|---|
| EP | 0 651 328 A1 | 5/1995 | ............. | G06F/9/46 |
| EP | 0 762 273 | 3/1997 | ............. | G06F/9/44 |
| WO | WO 00/68776 | 11/2000 | ............. | G06F/9/00 |

OTHER PUBLICATIONS

"Asynchronous Software Communication Using Response Objects", IDM Technical Disclosure Bullentin, US, IBM Corp., New York, vol. 37, No. 2A, Feb. 1, 1994, pp. 617–618.

* cited by examiner

Primary Examiner—Viet D. Vu
(74) Attorney, Agent, or Firm—Beyer Weaver & Thomas LLP

(57) ABSTRACT

The present invention provides methods and apparatus for facilitating communication among a plurality of devices during a process being performed on a remotely located server. A broker is provided that is adapted for receiving and storing information associated with the process and capable of sending at least some of the information to selected ones of the devices.

65 Claims, 6 Drawing Sheets

DYNAMIC INSTALLATION AND CONFIGURATION BROKER

CROSS-REFERENCE TO RELATED APPLICATIONS

This application claims priority of U.S. Provisional Application No. 60/139,220 filed on Jun. 14, 1999 and entitled "DYNAMIC INSTALLATION AND CONFIGURATION BROKER," which is hereby incorporated by reference.

This application is also related to U.S. Provisional Application No. 60/133,054 filed on May 6, 1999, and entitled "ENTERPRISE JAVABEANS AND JAVA 2 PLATFORM," and as U.S Provisional Application No. 60/139,238, filed Jun. 14, 1999, and entitled "ENTERPRISE JAVABEANS," which are hereby incorporated by reference.

BACKGROUND OF THE INVENTION

1. Field of the Invention

The present invention relates generally to computer software and computer network applications. More particularly, the present invention relates to methods and apparatus for dynamically facilitating communication among components throughout a process being performed on a remotely located server, thereby facilitating management of the process among the components.

2. Discussion of Related Art

In today's technologically advanced society, businesses often support numerous computer systems. Moreover, since multiple sites are often maintained, computer systems are often situated a large distance apart from one another. Therefore, communication among the computer systems is often achieved via a computer network.

Since multiple computer systems within a computer network often perform the same functions and access the same data, a central repository for data and software is commonly maintained. Since numerous users access and depend upon this shared information, it is important that the data and software be reliable. In other words, the data must be up-to-date and the software must function with a minimum of errors. As a result, the shared data is frequently updated to reflect current business strategies and contacts. Similarly, the software is modified to correct problems as they are discovered. However, even when the software is determined to be reliable, new modules are commonly added to improve the functionality of the existing software. Accordingly, new or modified software components are installed and configured frequently in today's business environment.

In order to improve the functionality of existing software, a new or modified software application must be installed and configured with the appropriate parameters. As one example, companies often create web pages reflecting company and employee data. Since this data is constantly changing, it is important that these web pages be modified and installed with the correct data. As another example, libraries are often maintained to include software functions and procedures. Accordingly, new and modified software components are often added to such libraries so that the components are accessible by users of the network.

Although installation and configuration of a software application are theoretically simple processes, it is often necessary to perform the installation and/or configuration from a remote location. Depending upon the events occurring during the installation and the size of the application being installed or configured, the installation process may be a time-consuming one. Moreover, since the user initiating the installation and the server performing the installation are physically separated, it may be difficult for the user (or another network device or process) to determine the status of completion of the installation process. This is particularly important since the user will respond differently depending upon the feedback obtained during the installation process. For instance, the user may decide to cancel or pause the installation process in reaction to specific events that occur during the installation process. Similarly, an error may occur during the installation process that requires that the installation process be terminated. Furthermore, since other processes may be accessing or providing services to the application being installed, it may be difficult to install the application without interfering with these processes.

In view of the above, it would be beneficial if continual and accurate feedback during a process such as the installation process could be provided so that both sides of the process may maintain control throughout the process. In addition, it would be desirable if events occurring during the process could be communicated to other interested processes and devices.

SUMMARY

An invention is described herein that enables communication among a plurality of devices throughout a process that is performed on a remotely located server. This is accomplished through the use of a broker. The broker is adapted for receiving information associated with the process from one or more of the devices as well as communicating the information to selected ones of the devices.

According to one aspect of the invention, the broker is shared among two or more of the devices. More particularly, according to one embodiment, the broker is shared by the tool initiating the process and the server performing the process. Thus, the tool and the server may easily update the broker with information regarding the status of the process. In addition, the tool and the server may actively obtain information from the broker on a periodic basis rather than waiting for the information that is sent from the broker. In this manner, the devices can communicate information regarding management of the process among one another via the broker.

According to another aspect of the invention, the broker communicates information (i.e., updates) to only those devices that have registered as listeners to the broker. In this manner, devices may indicate to the broker that they are interested in the process. The broker then sends the updates (e.g., information recently stored in the broker) to the listeners each time the broker is updated with information regarding the state of the process.

The present invention may be used to facilitate communication among multiple components throughout any process that is performed on a remotely located server. For instance, the present invention may be used to install, de-install, or configure any document or file dynamically on a server. Thus, the shared broker may include information relevant to the configuration process or any other process. Accordingly, the broker may be shared between any number of components to dynamically communicate status information regarding any process, thereby facilitating management of the process.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

The present invention provides methods and apparatus for dynamically and incrementally providing feedback throughout a process being performed on a remotely located server, thereby enabling multiple parties to manage a single process. According to one embodiment, the present invention is used to facilitate communication among components during the installation of an application. This is accomplished through the use of a "broker" that is shared between the client initiating the installation and the server performing the installation. In this manner, both sides of the process maintain control throughout the installation process. In addition, through the broker, events occurring during the process may be communicated to other processes and devices. An exemplary implementation of the broker will be shown and described with reference to FIG. 2. In addition, exemplary functions supported by the broker will be shown and described in further detail with reference to FIG. 3 and FIG. 4.

In the following description, installation refers to the loading of an application onto a remotely located server. In addition, installation of an application may further include the de-installation or configuration of the application once it is loaded onto the server. For instance, configuration may include providing parameter values and other configuration information. Moreover, a server will hereinafter refer to any device capable of running the software application and may further include a process or device that provides services to or otherwise accesses services of the application being installed.

Figure 1A:
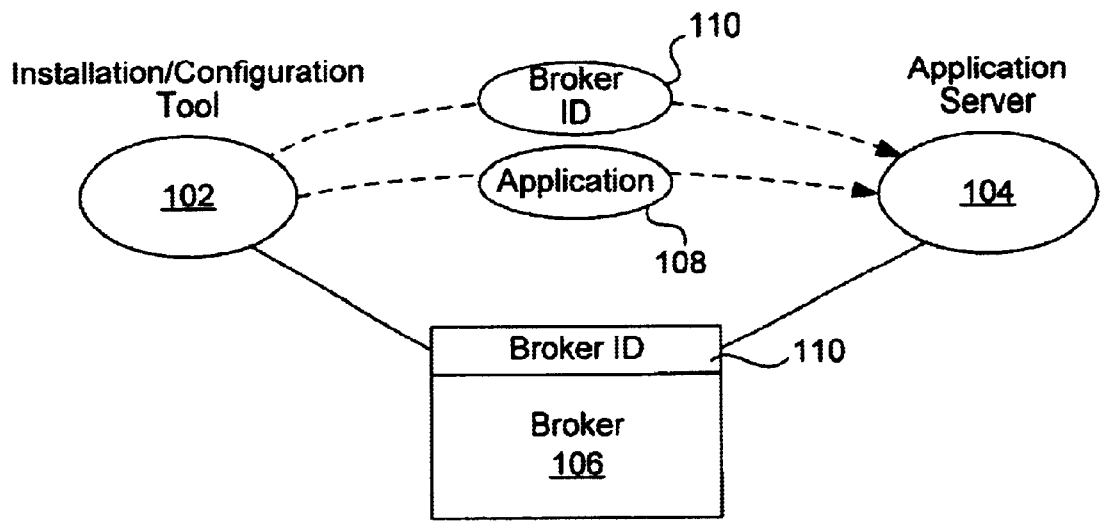
FIG. 1A is a block diagram illustrating an exemplary system in which a broker may be implemented to facilitate installation, de-installation and configuration of an application on a remote server.

An exemplary system in which a broker may be implemented to facilitate the installation, de-installation and configuration of an application on a remote server is illustrated in FIG. 1A. In the embodiment shown, the system includes an installation tool 102, a server 104 and a broker 106. The installation tool 102 enables a user to perform an installation, de-installation, or configuration of an application on a remotely located server 104 (i.e., application server). More particularly, the installation tool 102 enables a user to load one or more software components onto a server. The broker 106 is in communication with both the installation tool 102 and the server 104 and is arranged to facilitate communication between the installation tool 102 and the server 104 throughout the installation process. In addition, the broker 106 is adapted for communicating status information regarding the installation process to other processes/devices. It is important to note that the information communicated by the broker is transmitted dynamically throughout the process performed by the server. According to one embodiment, the installation tool 102 creates (e.g., instantiates) the broker 106 and identifies the broker 106 to the server 104 so that the broker 106 is accessible by the server 104 performing the installation.

Figure 3:
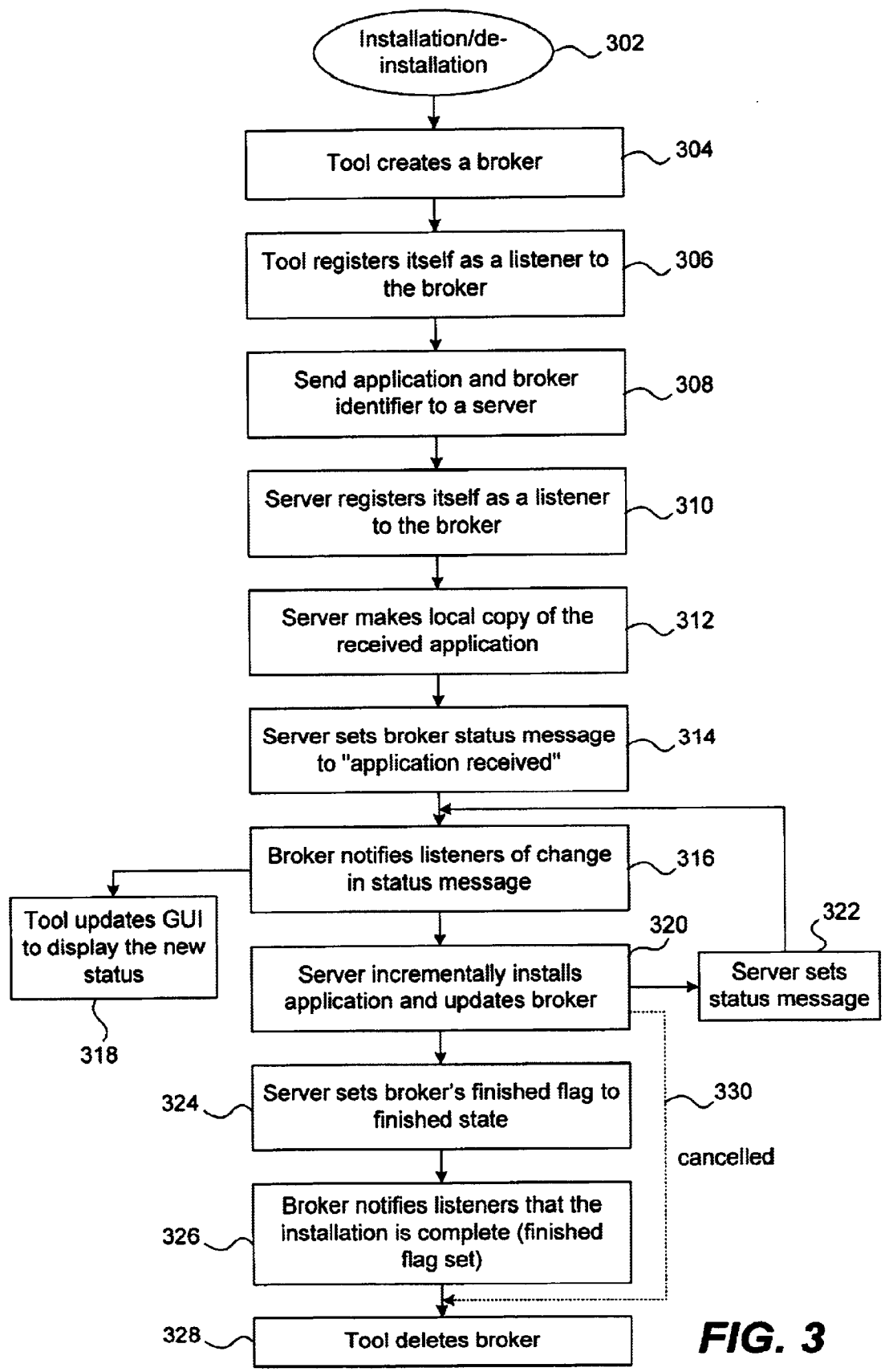
FIG. 3 is a process flow diagram illustrating a method of performing remote installation of an application according to one embodiment of the invention.
Figure 4:
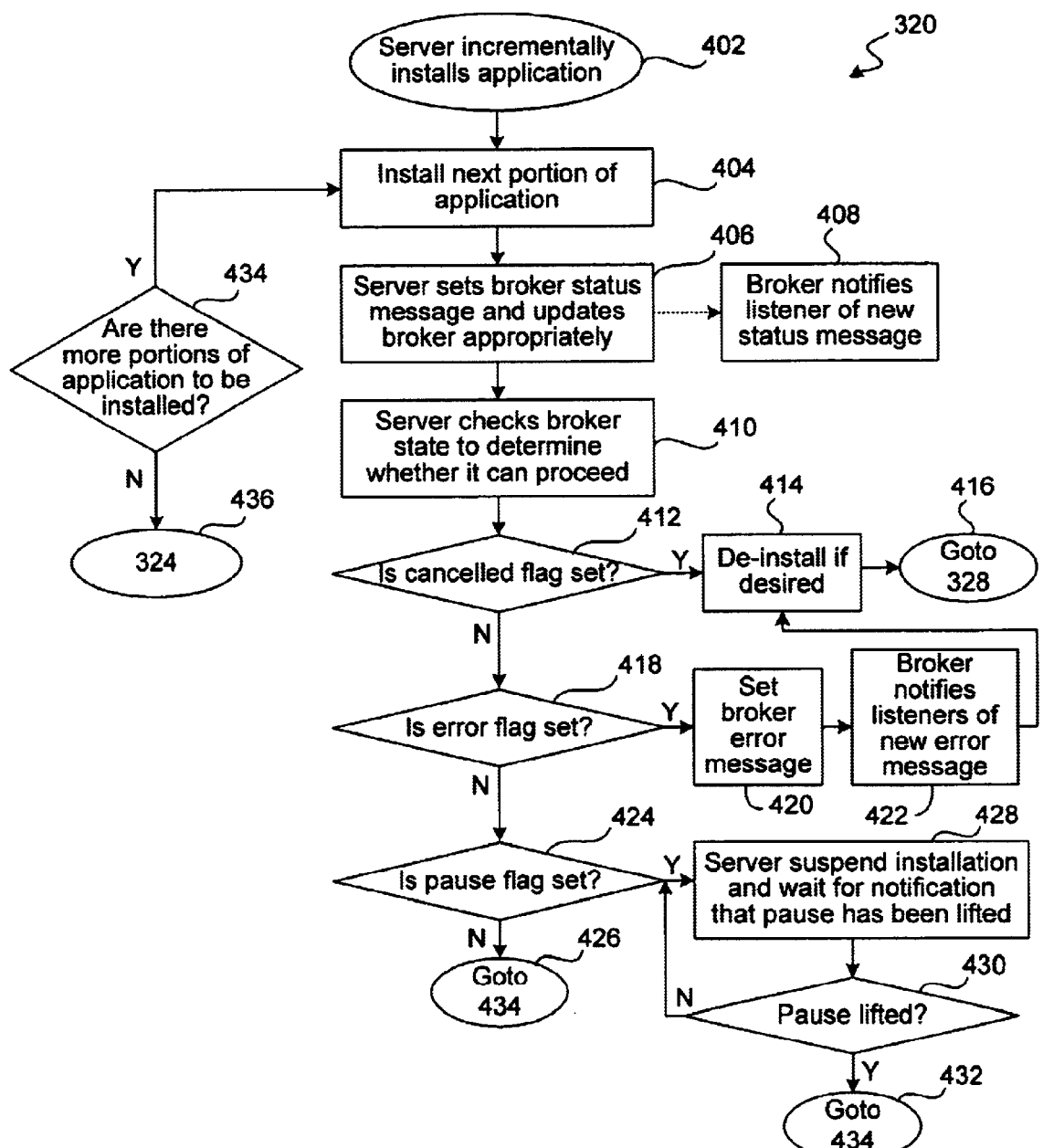
FIG. 4 is a process flow diagram illustrating a method of performing incremental installation of an application according to one embodiment of the invention.

As will be described in further detail below with reference to FIG. 3 and FIG. 4, in order to initiate the installation process, the tool 102 identifies an application 108 to be loaded onto the server 104. This may be accomplished, for example, by sending the application 108 or a reference to the application 108 (e.g., a pointer to the application) to the server. In addition, in order to enable the server 104 to access the broker 106, the tool transmits a broker identifier 110 to the server 104. For example, the broker identifier 110 may be a pointer or other reference to the broker 106. Once the application server 104 receives the broker identifier 110, the broker is shared by the client and the server throughout the installation process. Both the tool 102 and the server 104 may each update the status of the installation process via the shared broker 106. As one example, a client may wish to pause or cancel the installation process through the tool 102. The tool 102 therefore modifies the state of the broker 106 accordingly. As another example, an error may occur during the installation process. The server 104 (or the tool 102) therefore indicates the error in the state of the broker 106. Each time the state of the broker is modified, the broker 106 provides the state or modifications to the broker state to those entities interested in the installation process. In this manner, both the client and the server are provided fine-grained control over the installation process. Moreover, through the broker, the client and the server communicate with each other as well as with listeners of the installation process. Accordingly, through such communication, it is possible to install an application on a server without interfering with a process that provides services to or accesses the services of the application being installed.

Figure 1B:
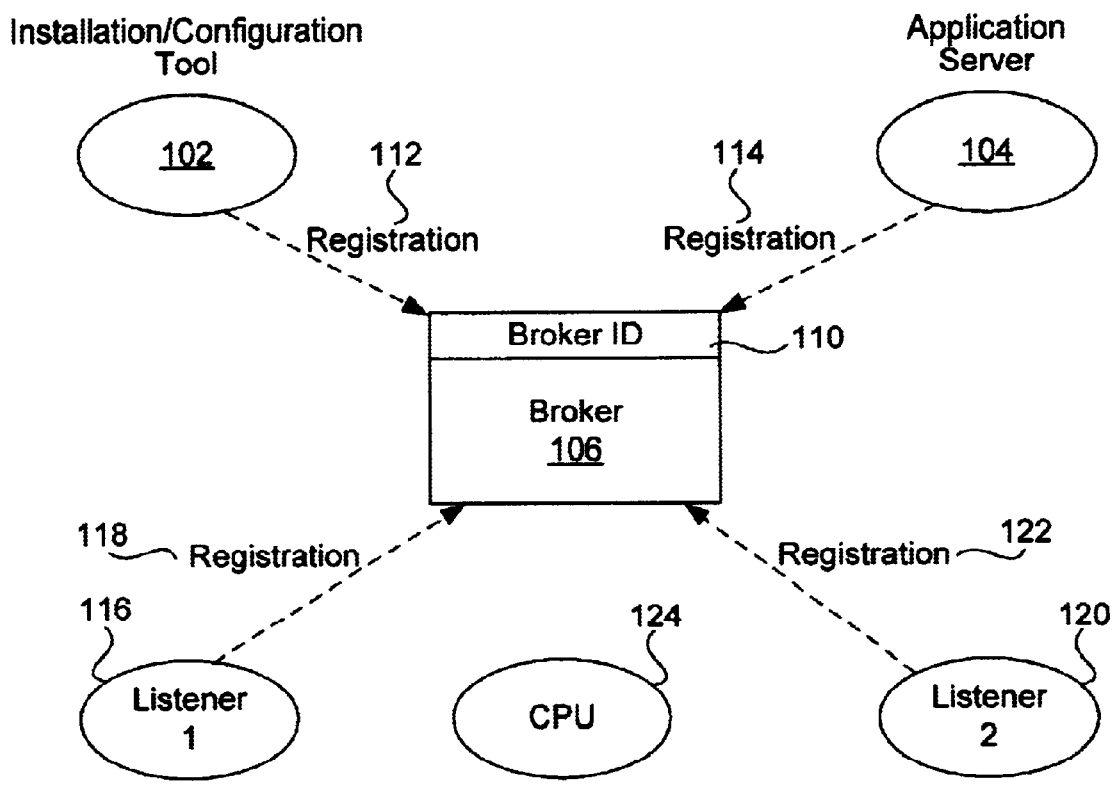
FIG. 1B is a block diagram illustrating the registration of various entities as listeners to the broker illustrated in FIG. 1A.

Once the broker is created, the broker notifies various entities of the state of the installation via updates throughout the installation process. For instance, the updates may include general status messages as well as error messages. While some entities may wish to receive broker state updates, others may not wish to receive the broker state updates or may not be entitled to such updates. Thus, according to one embodiment, such updates are sent only those entities that have registered as "listeners" to the broker. FIG. 1B is a diagram illustrating the registration of various entities as listeners to the broker and therefore listeners to the installation process. Although the tool 102 and the server 104 have access to the shared broker 106, it is also desirable to receive notifications of time sensitive events. Thus, both the tool 102 and the server 104 register with the broker 106 as listeners via registration requests 112 and 114, respectively. In addition, entities other than the tool 102 and the server 104 may register with the broker 106 as listeners. A first listener 116 sends a registration request 118 to the broker 106. In addition, a second listener 120 sends a registration request 122 to the broker. However, an entity such as a CPU 124 may not wish to receive information regarding the state of the installation process and may therefore choose not to register with the broker.

The broker may accept all registration requests that are received. Alternatively, the broker may accept only selected registration requests as permitted in an access list of the broker or server. For instance, the access list may list one or more IP addresses of those entities that are permitted or denied access to the state of the broker via registration as listeners to the broker. Once the registration requests are processed by the broker 106, the listeners receive updates from the broker 106 regarding the state of the installation process. Accordingly, through registration as listeners, multiple entities may monitor the installation process.

Each listener may wish to be informed of a variety of events occurring during the installation process. For instance, listeners may wish to be notified when a user pauses or cancels the installation process via the tool. Moreover, it may be desirable to discontinue the installation process when an error occurs. It would therefore be beneficial if such events could be stored and communicated to the listeners as appropriate. According to one embodiment, such state changes are recorded within the broker and define the state of the broker.

Figure 2:
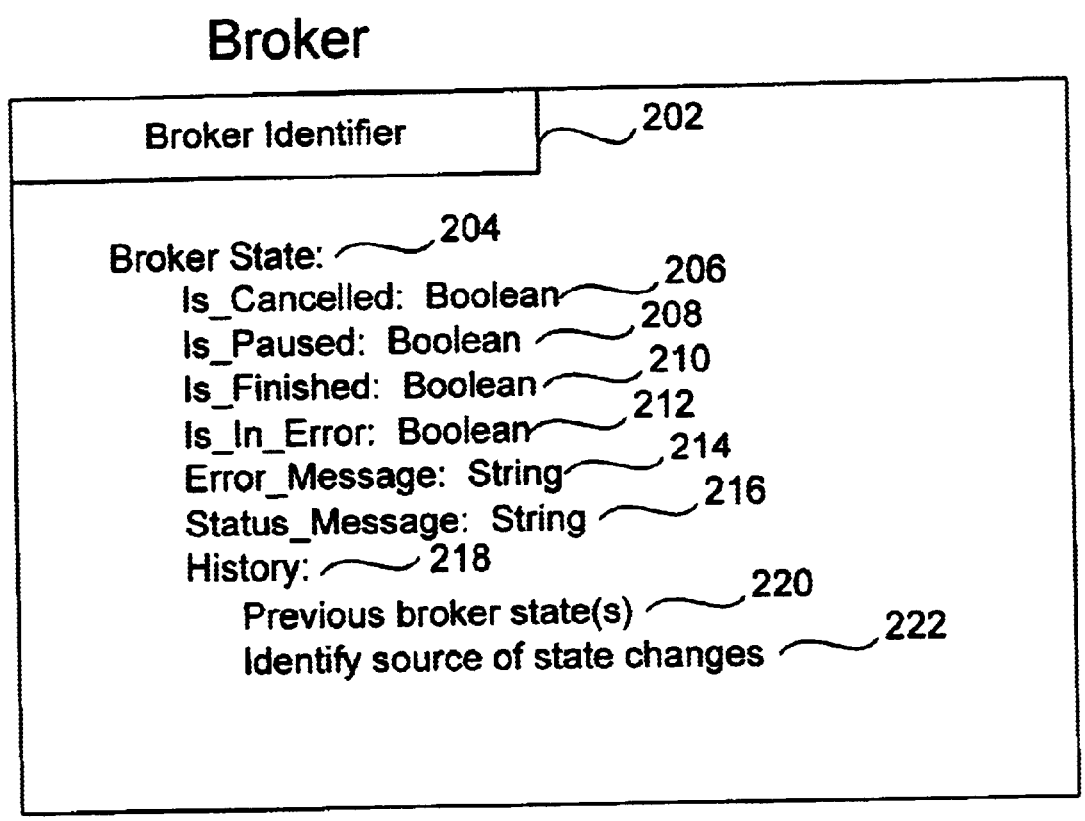
FIG. 2 is a diagram illustrating an exemplary broker data structure.

The broker that is shared between the tool and the server may be implemented in a variety of ways. For instance, the broker may be implemented as an instantiated object. FIG. 2 is a diagram illustrating an exemplary data structure that may be used to implement a broker. As shown, the broker is identified by a broker identifier 202 such as a pointer, variable name, or other mechanism. In addition, the broker includes a broker state 204 that includes, but is not limited to, a record of events occurring during the installation process as well as messages communicated in response to these events. In addition, the broker state 204 may record previous states of the broker as well as the current state. Multiple components may share the broker so that they may independently update the broker state as well as examine the broker state. According to one embodiment, the broker is further configured to send out broker updates (e.g., messages stored in the broker state) to listeners in response to events that are logged in the broker state 204. In this manner, the broker facilitates communication among multiple devices throughout the installation process.

As shown in FIG. 2, the current state of the broker and therefore broker state updates associated with specific events (e.g., errors) are temporarily stored in the form of flags (i.e., indicators) and strings (i.e., messages). It is important to note that the flags and messages may be set by either side of the installation process. Thus, both the server and the tool may independently set a flag and/or message to communicate with the other side of the process (e.g., server or tool) as well as with listeners of the process. In this manner, both sides of the installation process control the state of the broker. Since both the server and the tool share the broker, the server and the tool may actively obtain these updates from the broker. Alternatively, the server and the tool may wait until the broker sends the broker updates to the listeners. Once the broker updates are obtained, the server and the tool react accordingly. In this manner, both sides of the installation process maintain control over the broker and therefore manage the installation process through the broker.

Flags may be created to indicate the occurrence of a variety of events. For instance, a client requesting the installation may cancel as well as pause the installation process. Thus, an IS_CANCELLED flag 206 is provided in the broker state 204 and set to FALSE. When a client cancels the installation process, this is indicated in the IS_CANCELLED flag 206 which is then set to TRUE. Similarly, an IS_PAUSED flag 208 is set to FALSE in the default state and set to TRUE when a client (or the server) pauses the installation process.

In addition to reflecting broker state changes initiated by the client requesting the installation, the broker state 204 reflects broker state changes initiated by the server performing the installation. For instance, when the installation process is completed, the server sets an IS_FINISHED flag 210 to TRUE. Moreover, if an error occurs during the installation process, an IS_IN_ERROR flag 212 is set to TRUE. Since there are numerous errors that can occur during a single process, a particular error may be indicated as an ERROR_MESSAGE 214 that may be sent to the listeners during the installation process. In addition, it may be desirable to communicate events other than errors to the listeners during the installation process. For instance, when an application is received by the server, it may be desirable to communicate this broker state update to the listeners. Thus, such a message may be stored as a STATUS_MESSAGE 216. Once recorded in the broker state 204, the broker state updates may be communicated to selected listeners.

Once the current broker state is communicated to the listeners, the current state is initialized to a default state. For instance, flags may be set to FALSE and strings may be initialized to an empty string. In this manner, the current broker state may be reset during the incremental installation process.

During the installation process, it is possible that the server could crash or it may be necessary to bring the server down due to an event occurring during the installation. Should there be a problem during the installation process that causes the installation process to terminate, it would be desirable if the installation process could be resumed from the termination point. Thus, the previous states of the broker may be recorded as a history 218 data structure. The history 218 may reflect previous broker states 220 as well as identify one or more sources 222 of the state changes. For instance, the identity of the user that cancelled the process may be indicated. Information regarding the stage of completion of the installation procedure may be stored prior to bringing the server down. Alternatively, the information regarding the status and state of completion of the installation may be stored on a periodic basis to enable the broker to be restored in the event that the server crashes. The broker or the state of the broker may then be saved to memory (e.g., disk or database) to allow the installation process to be resumed at a later time.

Throughout the installation process, the broker state is updated and the listeners are notified of these broker state updates. One method of remote installation of an application according to one embodiment of the invention is presented in FIG. 3. The process begins at block 302 via an installation/configuration tool. As shown at block 304, the tool creates (e.g., instantiates) a broker. The broker is then stored such that it may be shared by both the tool and the server. Since it may be desirable to discontinue the installation process when an error occurs, the tool registers itself as a listener to the broker at block 306 so that it will receive notifications of errors occurring during the installation process. The tool then sends application data identifying the application being installed (or configured) and a broker identifier identifying the broker to a server selected to perform the installation at block 308. The application data may include the application being installed. Alternatively, rather than sending the application, a reference to the application (e.g., pointer) may be sent. Moreover, the application data may include configuration information (e.g., parameter values) for configuring the application.

Once the server receives the application and the broker identifier, the server registers itself as a listener to the broker at block 310. Upon completion of the registration process, the server is then notified of updates to the broker state that are subsequently sent to the listeners. According to one embodiment, each listener receives all broker state updates each time the broker state is updated. However, each listener may be interested in only specific broker state updates. For instance, although it is desirable to notify the server that the process has been paused by the tool, a third party listener (e.g., other than the tool or the server performing the installation) may not be interested in whether the process has been paused. Thus, according to another embodiment, each listener designates those state changes for which it wishes to receive notifications.

Since the server may be running an administrative process that provides services to or accesses the services of the application being installed, it is often important that the installation be performed incrementally so as not to disrupt the coexisting administrative process. The server therefore makes a local copy of the received application at block 312 so that the application may be installed in portions. The server then sets a broker status message to "APPLICATION RECEIVED" at block 314. The broker then notifies the listeners of the change in the broker status message at block 316. Once the new broker status message is received by the installation tool, the installation tool then updates a deployment progress dialog box illustrating the progress of the installation with the new broker status at block 318.

Once the application has been received from the tool, the server incrementally installs the application and updates the state of the broker accordingly at block 320. In this manner, one or more software components such as web pages or libraries of code are loaded onto the remote server. Until the installation is complete, the state of the broker is therefore updated to indicate all relevant information regarding updates provided by the server (e.g., errors occurring during the installation) as well as updates provided by the tool (e.g., canceling or suspending the process). The incremental installation and update process will be described in further detail below with reference to FIG. 4.

The server then sets the status message as appropriate at block 322. As one example, the status message may indicate the stage of completion of the installation process. For instance, the status message may be set to "STAGE 2 COMPLETED." As another example, the status message may indicate that the installation has been cancelled or paused. Once the status message is set, the broker notifies the listeners of the change in status message at block 316.

Upon completion of the installation process, the server sets the broker's IS_FINISHED flag to TRUE to indicate the finished state of the installation process at block 324. The broker then notifies the listeners that the installation process is complete at block 326. However, if an error occurs during the installation process or the installation process is cancelled by the user, processes 324 and 326 may be skipped as shown at line 330. It may be desirable to keep the broker for only the current session and therefore the broker may be eliminated at block 328. Thus, the tool deletes the broker. Alternatively, the tool and the server may de-reference the broker. It may also be desirable to store at least a portion of information provided in previous brokers or broker states as a history. Thus, the history may be stored in the data structure of the broker as previously shown and described with reference to FIG. 2. Alternatively, rather than storing the history within the broker itself, a third party auditor may register as a listener and maintain a log of transactions and events occurring during the installation process.

As previously described with reference to block 320 of FIG. 3, the server incrementally installs the application and updates the broker as appropriate. One method of incremental installation of an application according to one embodiment of the invention is illustrated in FIG. 4. The process begins at block 402 and the next portion of the application is installed at block 404. The server then sets the broker status message and updates the broker state as appropriate at block 406. For instance, in addition to setting the broker status message indicating the stage of completion of the installation process, the broker state is updated to set other flags and messages (e.g., error messages) as appropriate. The broker then notifies the listener of the new status message at block 408. For instance, when the installation has been paused by the server, the server may set the broker status message to "WILL RESUME IN 10 MINUTES." This status message is then broadcast to all listeners.

Since the broker state has been recently updated at block 406, the server may determine from the broker state whether it can proceed at block 410. For instance, the installation process may be cancelled or paused by the user. Moreover, an error may occur during the installation process that prevents the continuation of the installation. The server may therefore modify the installation process according to the broker state.

When a user cancels the installation process, this is reflected in the state of the broker. The cancellation may be a hard or soft interrupt, and therefore the installation process may continue through the current application portion or the installation process may be aborted immediately. According to one embodiment, if it is determined at block 412 that the IS_CANCELLED flag is set to TRUE, the cancellation is interpreted as a soft interrupt and the process continues through the current application portion. The portions of the application that have been installed up to this point may then be de-installed at block 414. The process then continues at block 328 of FIG. 3 to delete the broker as indicated at block 416.

As described above, an error may occur during the installation process. The occurrence of an error is reflected in the state of the broker, as shown in FIG. 2. More particularly, the IS_IN_ERROR flag will be set to TRUE by the server or the tool and the specific error is described as an ERROR_MESSAGE within the broker state. Thus, if it is determined that the IS_IN_ERROR flag is set to true at block 418, the ERROR_MESSAGE specified in the broker state is set at block 420. The broker than notifies the listeners of the new error message at block 422. If the error is a fatal one, the sections of the application that have already been installed may be de-installed at block 414 and the process continues at block 416 as described above.

There are instances in which it will be desirable to pause the installation. For example, the installation may be a lengthy one and therefore the user may wish to pause the installation and resume it at a later time or date. There are also instances in which the server may pause the installation. For example, when the server starts running out of memory or other resources, it may pause the installation momentarily to free up the resources required to complete the installation. If the user or the server chooses to pause the installation, the IS_PAUSED flag in the broker state is set to TRUE. The server then suspends the installation and waits for notification that the pause has been lifted (when initiated by the user) or waits until it is appropriate to resume the installation (when initiated by the server) as shown at block 428. More particularly, the server may actively examine the IS_PAUSED flag in the broker state or wait for notification from the broker that the pause has been lifted (when initiated by the user). Similarly, the tool may examine the broker to determine when the pause has been lifted by the server or wait for such notification when it is sent by the broker to the listeners. As described above with reference to block 408, the server may also broadcast a status message such as "WILL RESUME IN 10 MINUTES" to indicate that the server has temporarily paused the installation. Once it is determined at block 430 that the pause has been lifted, the process continues at block 434 for the portions of the application that remain to be installed as indicated at block 432. Otherwise, the process loops at block 428 to suspend the installation until the pause has been lifted. If it is determined at block 424 that the IS__PAUSED flag is not set to TRUE, the installation process continues at block 434 for the remaining portions of the application as shown at block 426.

Figure 5:
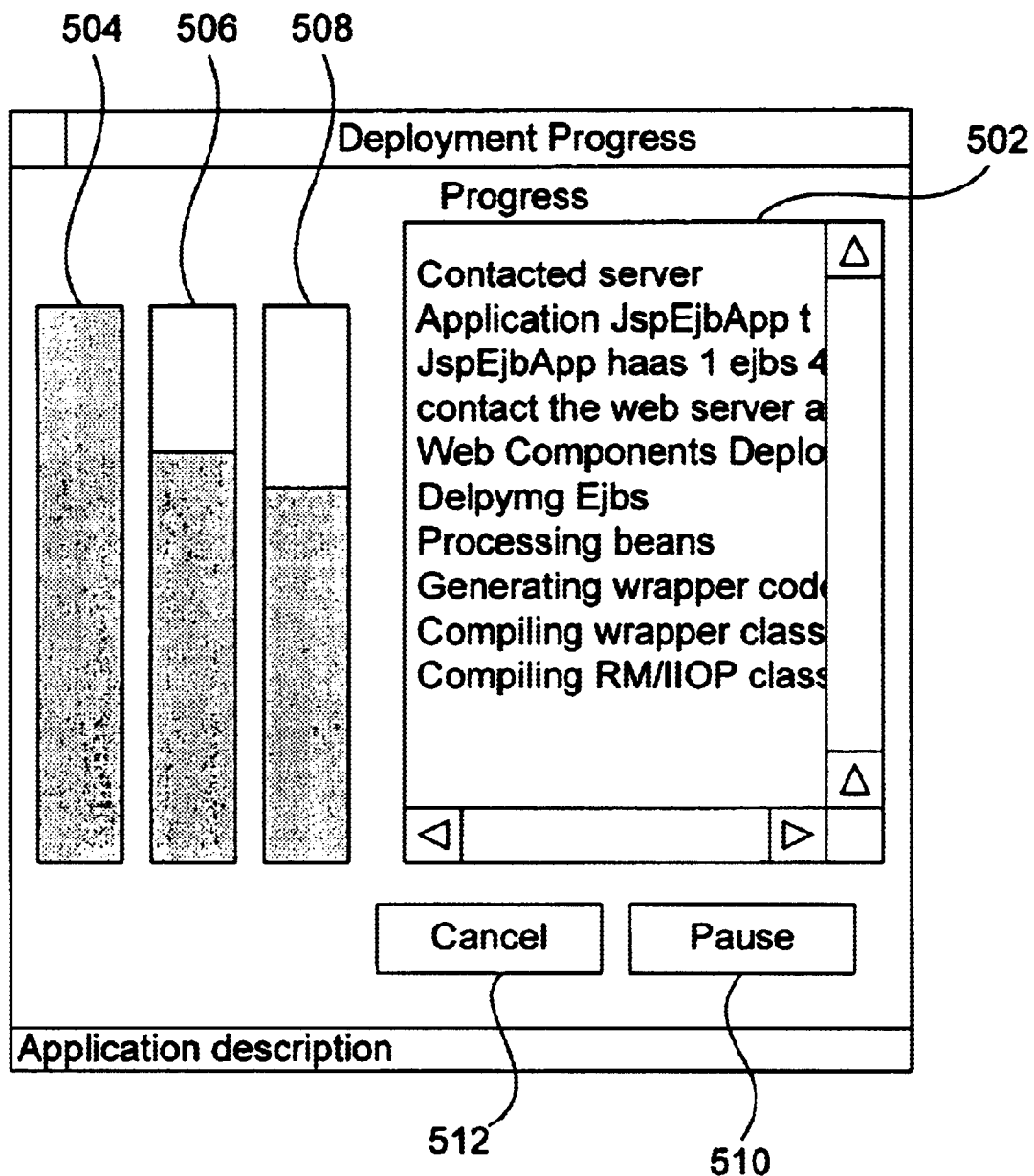
FIG. 5 is a screen shot illustrating an exemplary deployment progress dialog box suitable for use in presenting status information to the user of the installation tool.

During the installation process, the broker state is dynamically changing. Moreover, depending upon the status updates stored in the broker, the user may wish to cancel or pause the installation process. Thus, in order to enable the user to ascertain the state of the installation, the tool may provide updates as appropriate to the user interface of the installation tool. FIG. 5 is a screen shot of a dialog box suitable for use in presenting status information to the user interface of the installation tool. At window 502, message notifications such as status and error messages are displayed. In addition, the progress of installation for particular application segments may be displayed. For instance, the stage of installation for servlets 504 and web pages 506 may separately be displayed. In addition, the progress of the installation process for the entire application may be displayed at 508. From this display, the user may wish to pause 510 or cancel 512 the installation.

During a long and time-consuming installation, the user may wish to pause the installation so that the user may resume the installation at a later time. The user therefore selects the pause button 510. When the pause button 510 is selected, the tool sets the IS__PAUSED flag to TRUE. The server then determines from the broker state that the installation process has been paused. The server may either actively obtain information from the broker or may wait until it receives updates from the broker. The server then waits until the IS__PAUSED flag is set to FALSE. More particularly, the server will actively check the IS__PAUSED flag at regular intervals or wait until it receives notification from the broker that the server may resume the installation process.

In addition, the user may want to cancel the installation while the installation is in progress. When the user selects the cancel button 512, the tool sets the IS__CANCELLED flag to TRUE. From the broker state, the server then determines that the installation process has been cancelled and reacts accordingly. The server may be notified of the cancellation when the server receives broker state updates sent from the broker. Alternatively, the server may actively check the broker state at a later point in time. For instance, the server may check the contents of the broker at regular intervals. When the server learns that an entity wants to cancel the installation, the server then performs either a hard or soft interrupt as described above. The user may then initiate a new installation process or end the session.

Although the above description refers to the process of installation, the present invention may be equally applicable to facilitating communication among multiple components throughout any process that is performed on a remotely located server. Moreover, although the above description refers to an "application," the present invention may be used to install, de-install, or configure any document or file dynamically on a server. Thus, the shared broker may include information relevant to the configuration process or any other process. Accordingly, the broker may be shared between any number of components to dynamically communicate status information regarding any process.

Figure 6:
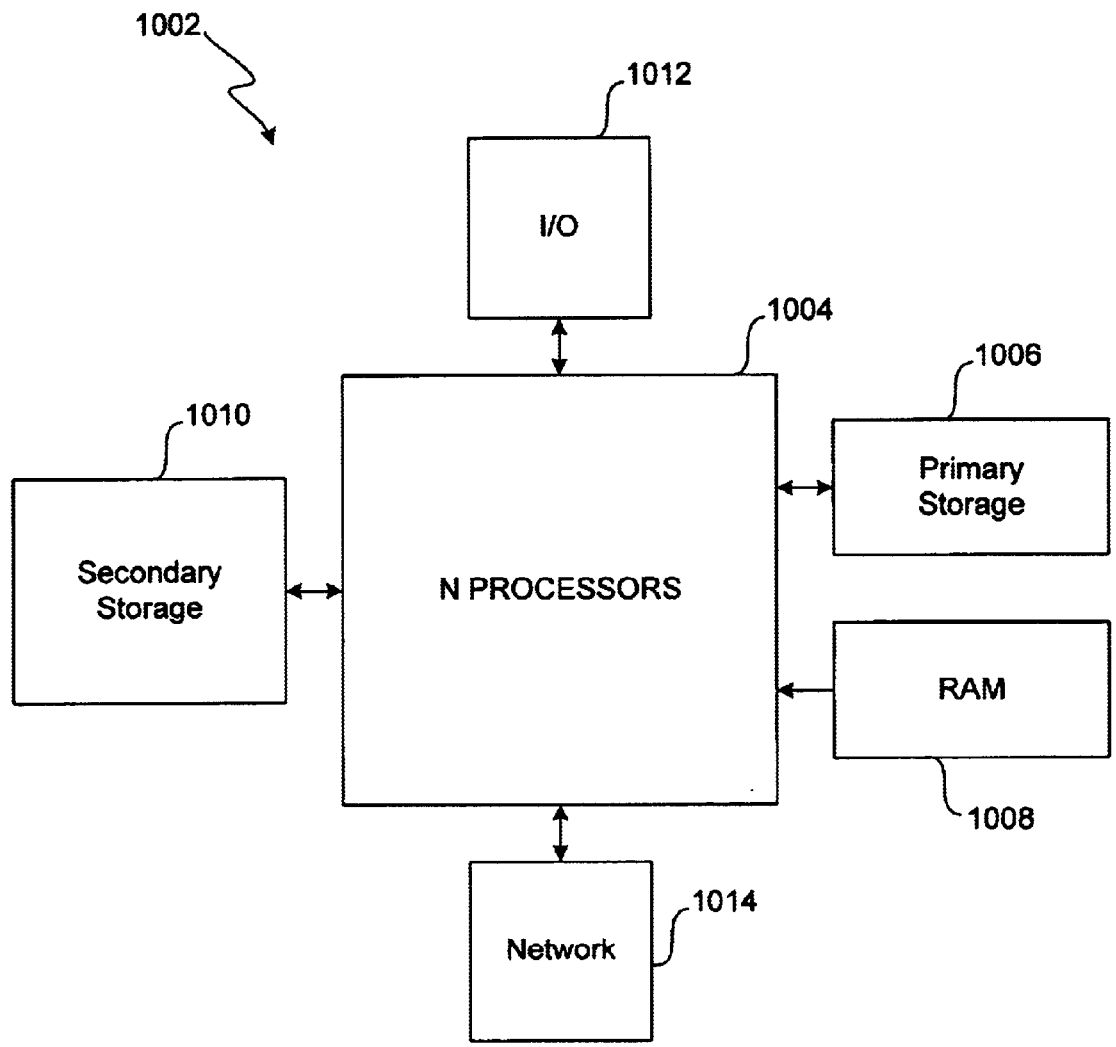
FIG. 6 is a block diagram illustrating a typical, general-purpose computer system suitable for implementing the present invention.

The broker, the installation tool, and the server may generally be implemented on any suitable computer system. FIG. 6 illustrates a typical, general-purpose computer system 1002 suitable for implementing the present invention. The computer system 1002 includes any number of processors 1004 (also referred to as central processing units, or CPUs) that may be coupled to memory devices including primary storage device 1006 (typically a read only memory, or ROM) and primary storage device 1008 (typically a random access memory, or RAM). As is well known in the art, ROM acts to transfer data and instructions unidirectionally to the CPUs 1004, while RAM is used typically to transfer data and instructions in a bi-directional manner. Both the primary storage devices 1006, 1008 may include any suitable computer-readable media. The CPUs 1004 may generally include any number of processors.

A secondary storage medium 1010, which is typically a mass memory device, may also be coupled bi-directionally to CPUs 1004 and provides additional data storage capacity. The mass memory device 1010 is a computer-readable medium that may be used to store programs including computer code, data, and the like. Typically, the mass memory device 1010 is a storage medium such as a hard disk which is generally slower than primary storage devices 1006, 1008.

The CPUs 1004 may also be coupled to one or more input/output devices 1012 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, the CPUs 1004 optionally may be coupled to a computer or telecommunications network, e.g., an internet network or an intranet network, using a network connection as shown generally at 1014. With such a network connection, it is contemplated that the CPUs 1004 might receive information from the network, or might output information to the network in the course of performing the below-described method steps. Such information, which is often represented as a sequence of instructions to be executed using the CPUs 1004, may be received from and outputted to the network, for example, in the form of a computer data signal embodied in a carrier wave.

Although illustrative embodiments and applications of this invention are shown and described herein, many variations and modifications are possible which remain within the concept, scope, and spirit of the invention, and these variations would become clear to those of ordinary skill in the art after perusal of this application. For instance, although the broker is described as an instantiated object, the broker may be implemented in a variety of ways. Moreover, the broker may include a variety of fields other than those illustrated. As a result, the above described process blocks are illustrative only and may vary depending upon the implementation of the broker. Accordingly, the present embodiments are to be considered as illustrative and not restrictive, and the invention is not to be limited to the details given herein, but may be modified within the scope and equivalents of the appended claims.

What is claimed is:

1. A method of facilitating communication among a plurality of devices during an application installation process initiated by one of the plurality of devices, the method comprising:

generating a broker that is to be shared by two or more of the plurality of devices during the application installation process, the broker being adapted for storing a plurality of status updates provided by the two or more devices and being capable of communicating the status updates to selected ones of the devices, each of the status updates including status information associated with the process, the two or more devices including a first device upon which one or more software components are installed during the process and a second device responsible for initiating the installation of the one or more software components on the first device; and at least one of receiving selected ones of the status updates regarding the application installation process from the broker and updating the broker with one of the status updates regarding the application installation process, wherein updating the broker is performed by the first device upon which one or more software components are installed during the process or the second device responsible for initiating the installation of the one or more software components on the first device.

2. The method as recited in claim 1, further comprising:

receiving selected status updates regarding the application installation process from the broker; and wherein updating the broker is performed in response to the selected status updates regarding the application installation process received from the broker.

3. The method as recited in claim 1, further comprising registering as a listener to the broker so that the broker is notified to communicate at least some of the status updates to the listener.

4. A method of facilitating communication among a plurality of devices during an application installation process initiated by a first one of the plurality of devices such that the application is installed on a second one of the plurality of devices, the method comprising:

accessing a broker that is shared by two or more of the plurality of devices, the broker being adapted for storing a plurality of status updates provided by the two or more devices and being capable of communicating the status updates to selected ones of the devices, the updates including information regarding the application installation process, the two or more devices including the second device upon which one or more software components are installed during the process and the first device responsible for performing or initiating the installation of the one or more software components on the first device;

performing at least a portion of the application installation process such that one or more software components are installed on the second device; and at least one of receiving selected ones of the status updates from the broker and updating the broker to store one of the status updates associated with the portion of the application installation process performed, wherein updating the broker is performed by the first device responsible for performing or initiating the installation of the one or more software components on the second device or the second device upon which one or more software components are installed.

5. In a source network device, a method of providing a data structure suitable for use in installing an application on a server such that one or more software components are loaded onto the server, comprising:

generating a broker adapted for storing one or more updates supplied by at least one of the source network device and the server, each of the updates indicating a status of the installation of the application on the server, the broker being capable of communicating the updates to one or more network devices, the server being a device upon which the one or more software components are installed and the source network device being responsible for performing or initiating the installation of the one or more software components on the server;

sending application data that identifies the application from the source network device to the server to enable the server to install the application; and wherein the broker is accessible to the server and the source network device, thereby enabling the server and the network device to modify the updates stored by the broker such that the modified updates can be communicated to the one or more network devices.

6. The method as recited in claim 5, wherein the broker is capable of communicating the updates to each one of the network devices that has registered as a listener to the broker.

7. The method as recited in claim 5, further comprising sending a broker reference identifying the broker to the server so that the server can access and update the broker.

8. The method as recited in claim 5, further comprising sending the application to the server.

9. The method as recited in claim 8, wherein the application has associated configuration information that includes one or more parameter values.

10. The method as recited in claim 5, wherein the one or more network devices include the source network device and the server.

11. The method as recited in claim 5, wherein the one or more network devices include a device other than the source network device and the server.

12. The method as recited in claim 5, further comprising at least one of de-referencing the broker and deleting the broker.

13. The method as recited in claim 5, further comprising registering as a listener to the broker so that selected updates are received from the broker.

14. The method as recited in claim 13, further comprising receiving the selected updates from the broker.

15. A method of installing an application including one or more software modules, comprising:

(a) receiving application data that identifies the application at a network device;

(b) installing a portion of the application on the network device; and (c) updating a broker associated with the application with one or more updates associated with the installation of the portion of the application, each of the updates indicating a status of the installation of at least a portion of the application on the network device, the broker being capable of communicating the one or more updates to one or more network devices that have registered as listeners to the broker so that one or more of the updates are received from the broker during the installation of the application on the network device.

16. The method as recited in claim 15, further including repeating steps (b) and (c) until the installation is at least one of completed, cancelled, suspended, and terminated.

17. The method as recited in claim 15, further comprising receiving a broker reference identifying the broker.

18. The method as recited in claim 15, further comprising receiving the application, wherein the updates are received from at least one of a device initiating the installation of the application and a device installing the application.

19. The method as recited in claim 15, further comprising registering as a listener to the broker so that selected updates are received from the broker during the installation of the application.

20. The method as recited in claim 15, further comprising: receiving selected ones of the updates from the broker.

21. The method as recited in claim 15, wherein when the broker receives an update that indicates an occurrence of an error during the installation, terminating the installation and de-installing portions of the application that have previously been installed.

22. The method as recited in claim 15, wherein when the broker receives an update that indicates a cancellation of the installation, terminating the installation and de-installing portions of the application that have previously been installed.

23. The method as recited in claim 15, wherein when the broker receives an update that indicates that the installation has been paused, suspending the installation until a notification indicating that the pause has been lifted is received.

24. The method as recited in claim 15, further comprising at least one of de-referencing the broker and deleting the broker.

25. A method of installing an application including one or more software modules, comprising:
receiving application data that identifies the application to be installed on a device; installing at least one of the software modules on the device; and
updating a broker associated with the application with updates associated with the installation of the application, the updates including information regarding the status of the installation of the at least one of the software modules of the application on the device, the broker being capable of communicating the updates to one or more network devices that have previously registered with the broker as listeners to the broker during the installation of the application on the device.

26. The method as recited in claim 25, further comprising receiving a broker reference identifying the broker.

27. The method as recited in claim 25, further comprising registering as a listener to the broker so that the updates are received from the broker.

28. The method as recited in claim 25, wherein the configuration information includes one or more parameter values.

29. A method of transmitting information during installation of an application including one or more software modules on a server, comprising:
(a) providing a broker adapted for storing one or more updates associated with the installation of the application on the server, each of the updates indicating a status of the installation of one or more of the software modules of the application on the server, the broker being capable of communicating the updates to one or more receiving devices throughout the installation of the application;
(b) receiving at the broker the one or more updates from at least one of the server performing the installation of the application including one or more software modules and a device initiating the installation of the application including one or more software modules on the server; and
(c) transmitting from the broker at least a portion of the updates to the one or more receiving devices that have registered as listeners to the broker.

30. The method as recited in claim 29, further including repeating steps (b) and (c) until the installation is at least one of completed, cancelled, suspended, and terminated.

31. A method of transmitting information during installation of an application including one or more software modules on a server, comprising:
providing a broker adapted for storing one or more status updates associated with the installation of the application on the server, the broker being capable of communicating the status updates to one or more receiving devices, the status updates including information indicating a status of the installation of one or more of the software modules of the application on the server;
registering the one or more receiving devices as listeners to the broker so that the broker is notified to transmit at least a portion of the status updates to the one or more receiving devices throughout the installation of the application; and
transmitting at least a portion of the status updates to the one or more receiving devices that have registered as listeners to the broker.

32. The method as recited in claim 31, further including identifying one or more of the updates for which the one or more receiving devices request notifications.

33. The method as recited in claim 31, further including receiving a registration request from each one of the receiving devices, the registration request indicating a request for registration as a listener to the broker.

34. The method as recited in claim 31, wherein the one or more receiving devices include at least one of a server performing the installation and a network device that initiated the installation.

35. The method as recited in claim 31, wherein the one or more receiving devices include a receiving device other than a server installing the application and a network device that initiated the installation.

36. The method as recited in claim 31, wherein the application includes configuration information for configuring the application.

37. The method as recited in claim 31, further comprising:
updating the broker with the one or more updates regarding installation of at least a portion of the application.

38. The method as recited in claim 37, further comprising receiving the one or more updates from at least one of the server installing the application and a network device initiating the installation.

39. The method as recited in claim 37, further comprising communicating at least some of the updates to the one or more receiving devices.

40. The method as recited in claim 39, wherein the one or more updates include at least one of indicating an occurrence of an error during the installation and indicating a state of progress of the installation.

41. The method as recited in claim 40, wherein the one or more updates include a status message associated with the state of progress of the installation.

42. The method as recited in claim 40, wherein when the one or more updates include indicating the occurrence of an error, the one or more updates further including an error message specifying the error with a previous installation of one or more portions of the application.

43. The method as recited in claim 37, further comprising maintaining a history of broker updates that have been performed in association with a previous installation of one or more portions of the application.

44. The method as recited in claim 31, further comprising updating the broker with the one or more updates indicating at least one of cancellation of the installation and pausing the installation.

45. A computer system for facilitating communication among a plurality of devices during an application installation process initiated by one of the plurality of devices, comprising:

a memory; and a processor, wherein at least one of the memory and the processor are adapted to hot provide a broker that is capable of being shared by two or more of the plurality of devices, the broker being adapted for storing a plurality of updates received from the two or more devices and being capable of communicating the updates during the application installation process to selected ones of the devices that have registered as listeners to the broker, the updates including information associated with the application installation process, each of the updates indicating a status of at least a portion of the process, the two or more devices including a first device upon which one or more software components are installed during the application installation process and a second device responsible for performing or initiating the installation of the one or more software components on the first device.

46. The method as recited in claim 1, wherein the broker maintains an access list including one or more IP addresses and indicating whether each network device identified by the associated IP address is permitted to receive status updates regarding the application installation process from the broker.

47. The method as recited in claim 46, further comprising:
registering as a listener to the broker so that the broker is notified to communicate at least some of the status updates to the listener;
wherein the registration is accepted by the broker if the broker determines from the access list that the listener is permitted to receive status updates regarding the application installation process from the broker.

48. The method as recited in claim 1, wherein the broker maintains an access list including one or more IP addresses and indicating whether each network device identified by the associated IP address is permitted to update the broker with status updates regarding the application installation process.

49. The method as recited in claim 1, wherein the broker maintains an access list including one or more IP addresses that are permitted to receive status updates regarding the application installation process from the broker.

50. The method as recited in claim 49, further comprising:
registering as a listener to the broker so that the broker is notified to communicate at least some of the status updates to the listener;
wherein the registration is accepted by the broker if the broker determines from the access list that the listener is permitted to receive status updates regarding the application installation process from the broker.

51. The method as recited in claim 1, wherein the broker maintains an access list including one or more IP addresses that are permitted to update the broker with status updates regarding the application installation process.

52. The method as recited in claim 1, wherein the broker maintains a history of one or more events occurring during the application installation process.

53. The method as recited in claim 52, wherein the broker maintains a history of one or more status update messages communicated to one or more of the devices in response to the events.

54. The method as recited in claim 53, wherein one of the devices initiates transmission of one of the status update messages.

55. The method as recited in claim 54, wherein the one of the devices is not the first device or the second device.

56. The method as recited in claim 54, wherein the one of the devices initiates the transmission of one of the status update messages in response to one of the status updates regarding the application installation process.

57. The method as recited in claim 54, wherein the one of the devices initiates transmission of one of the status update messages by updating the broker with one of the status updates.

58. The method as recited in claim 1, wherein updating the broker with one of the status updates comprises setting an indicator in a state of the broker.

59. The method as recited in claim 1, wherein updating the broker with one of the status updates comprises setting a status message in a state of the broker.

60. The method as recited in claim 1, wherein updating the broker with one of the status updates regarding the application installation process comprises at least one of a modifying an application installation process status indicator and setting a message to be transmitted to one or more of the devices.

61. The method as recited in claim 60, wherein receiving selected ones of the status updates regarding the application installation process from the broker comprises receiving a message indicating a status of the installation process.

62. The method as recited in claim 5, wherein generating a broker comprises instantiating a broker object associated with the application installation process.

63. A computer-readable medium storing thereon computer-readable instructions for facilitating communication among a plurality of devices during an application installation process initiated by one of the plurality of devices, comprising:
instructions for generating a broker that is to be shared by two or more of the plurality of devices during the application installation process, the broker being adapted for storing a plurality of status updates provided by the two or more devices and being capable of communicating the status updates to selected ones of the devices, each of the status updates including status information associated with the process, the two or more devices including a first device upon which one or more software components are installed during the process and a second device responsible for initiating the installation of the one or more software components on the first device; and
instructions for at least one of receiving selected ones of the status updates regarding the application installation process from the broker and updating the broker with one of the status updates regarding the application installation process, wherein updating the broker is performed by the first device upon which one or more software components are installed during the process or the second device responsible for initiating the installation of the one or more software components on the first device.

64. A system for facilitating communication among a plurality of devices during an application installation process initiated by one of the plurality of devices, comprising:
means for generating a broker that is to be shared by two or more of the plurality of devices during the application installation process, the broker being adapted for storing a plurality of status updates provided by the two or more devices and being capable of communicating the status updates to selected ones of the devices, each of the status updates including status information associated with the process, the two or more devices including a first device upon which one or more software components are installed during the process and a second device responsible for initiating the installation of the one or more software components on the first device; and means for at least one of receiving selected ones of the status updates regarding the application installation process from the broker and updating the broker with one of the status updates regarding the application installation process, wherein updating the broker is performed by the first device upon which one or more software components are installed during the process or the second device responsible for initiating the installation of the one or more software components on the first device.

65. A system for facilitating communication among a plurality of devices during an application installation process initiated by one of the plurality of devices, comprising:

a processor; and a memory, at least one of the processor and the memory being adapted for:

generating a broker that is to be shared by two or more of the plurality of devices during the application installation process, the broker being adapted for storing a plurality of status updates provided by the two or more devices and being capable of communicating the status updates to selected ones of the devices, each of the status updates including status information associated with the process, the two or more devices including a first device upon which one or more software components are installed during the process and a second device responsible for initiating the installation of the one or more software components on the first device; and at least one of receiving selected ones of the status updates regarding the application installation process from the broker and updating the broker with one of the status updates regarding the application installation process, wherein updating the broker is performed by the first device upon which one or more software components are installed during the process or the second device responsible for initiating the installation of the one or more software components on the first device.

* * * * *

UNITED STATES PATENT AND TRADEMARK OFFICE
CERTIFICATE OF CORRECTION

PATENT NO.     : 6,633,899 B1
DATED          : October 14, 2003
INVENTOR(S)    : Daniel R. Coward It is certified that error appears in the above-identified patent and that said Letters Patent is hereby corrected as shown below:

<u>Column 14,</u>
Line 55, after "error" delete -- with a previous installation of one or more portions of the application --

<u>Column 15,</u>
Line 3, after "to" delete -- hot --

Signed and Sealed this

Thirteenth Day of July, 2004

JON W. DUDAS
*Acting Director of the United States Patent and Trademark Office*